Patented Apr. 13, 1926.

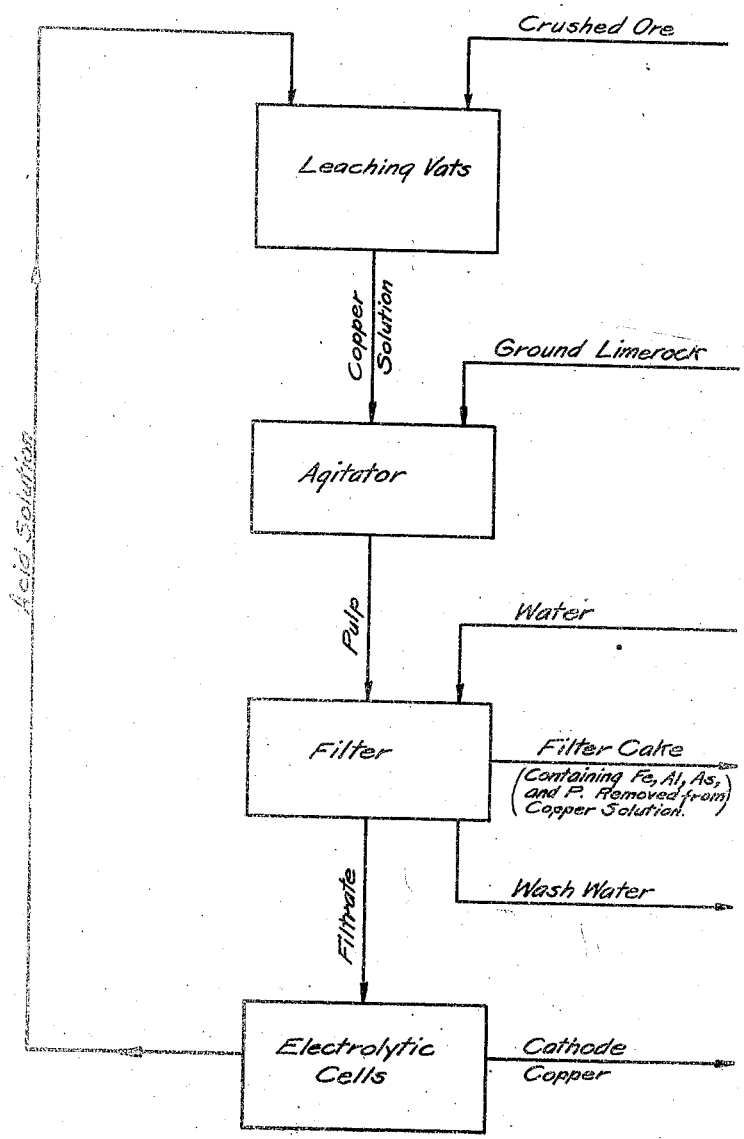

1,580,614

UNITED STATES PATENT OFFICE.

FREDERICK LAIST AND FREDERICK F. FRICK, OF ANACONDA, MONTANA, ASSIGNORS TO ANACONDA COPPER MINING COMPANY, OF ANACONDA, MONTANA, A CORPORATION OF MONTANA.

ELECTROLYTIC PRECIPITATION OF COPPER.

Application filed October 23, 1925. Serial No. 64,456.

*To all whom it may concern:*

Be it known that we, FREDERICK LAIST and FREDERICK F. FRICK, citizens of the United States, residing at Anaconda, in the county of Deerlodge and State of Montana, have invented certain new and useful Improvements in the Electrolytic Precipitation of Copper, of which the following is a specification.

This invention relates to the so-called leaching-electrolytic process for the recovery of copper from ores, and more particularly to a method of removing impurities, especially the iron, from the leaching solution.

In leaching-electroyltic processes as applied for the recovery of copper from oxide copper ores the customary procedure comprises leaching the ore with a solution containing sulfuric acid, thereby forming a solution containing copper sulfate, subjecting this solution to electrolysis whereby the copper is precipitated and the sulfuric acid combined with the copper is regenerated, and using the resulting solution containing the regenerated sulfuric acid for leaching more ore. The procedure, as is apparent, is cyclical.

In practice the simple procedure outlined ordinarily is not followed, but is modified or supplemented by other steps designed to take care of certain conditions which arise. One of these conditions is the presence of iron and other impurities derived from the ore in the solution produced by the leaching. More or less iron is always dissolved from the ore, the quantity thereof of course depending upon the ore treated and the method of leaching, if a satisfactory recovery of copper from the ore is made, that is, if the leaching of the ore is such as to accomplish a satisfactory recovery of copper. Iron is a most undesirable impurity in copper-bearing solutions from which the copper is to be recovered by electrolysis. In the electrolysis the iron is alternately oxidized at the anode and reduced at the cathode, thus reducing the current efficiency. The iron also causes a corrosion of the cathode, and besides the solution produced by the electrolysis and still containing the iron is far less effective as a leaching solution than is a solution free of or low in iron content. As will be apparent in the cyclical procedure outlined, unless steps are taken to remove iron from the cyclically moving liquid it will become continuously more and more contaminated with iron.

A common procedure for maintaining the iron content of the liquid within limits permitting commercial operation is by withdrawing a portion of the liquid from the cycle at a suitable point, which liquid contains some copper and a portion of the accumulated impurities and is replaced by fresh liquid, and recovering the copper content thereof as cement copper by precipitation with iron. This method is not satisfactory for several reasons, among which may be mentioned the cost of the iron used and the undesirability of cement copper as compared with cathode copper. Moreover, the quantity of iron ordinarily left in the cyclically moving solution, according to this method, reduces the efficiency of the leaching and of the electrolysis to an appreciable extent. It is necessary to make a compromise between the production of cement copper on the one hand and the quantity of iron left in the solution on the other hand, both the production of cement copper and leaving iron in the solution being undesirable. The harmful effect of iron in the leaching-electrolytic process for the recovery of copper from ores is well known and is discussed in the current literature.

We have developed a satisfactory commercial process for the removal of iron and other impurities associated therewith in the solutions used in leaching-electrolytic processes of which the procedure described below is an illustrative example.

A copper ore capable of yielding 25 to 30 pounds of copper per ton is leached, preferably by a counter-current procedure. About one-fourth of a pound of iron and one-twelfth of a pound of aluminum are dissolved with each pound of copper dissolved and the leaching solution may contain, for example, 40 grams of copper, 7 to 10 grams of iron, 5 to 6 grams of aluminum and 10 grams of free sulfuric acid per liter. This solution is agitated with limerock in the form of particles preferably of less than 65 mesh in quantity amounting to about 30 grams of limerock per liter of solution. Limerock is a natural limestone rock and may be regarded simply as an inexpensive supply of calcium carbonate. The agitation of the solution with the limerock results in a bulky precipitate containing principally basic iron and aluminum compounds and calcium sulfate which is separated by filtration and washed. This precipitate contains substantially all of the ferric iron or about 75 to 90 per cent of the total iron, about half of the aluminum and substantially all of the phosphorus arsenic and antimony present in the leaching solution treated. The purified solution containing 1½ to 2½ grams of iron per liter is well adapted for the electrolytic precipitation of its copper content. It gives a high yield of cathode copper and a regenerated sulfuric acid solution suitable for use directly for leaching a further quantity of ore.

The procedure described above is illustrated on the accompanying drawing which is a flow sheet of the process.

The precipitate produced by the limerock treatment of the leaching solution ordinarily contains about 2 percent or less of the total quantity of copper dissolved from the ore. This copper may be recovered, if it is economically feasible, by methods which are not a part of the present invention and which need not be described.

In connection with the foregoing example, it is noted that suitable changes in the specific procedure described may be made without departing from our invention. The procedure is applicable to any ore capable of being treated by the leaching-electrolytic process which contains impurities which would interfere with the continuous operation of the process and which may be removed by the limerock precipitation. The concentrations of the solutions referred to of course are merely illustrative and may be varied. The quantity of limerock to be used will vary with the acidity and quantity of impurities present in the solution treated and may also be varied to suit the degree of purification desired. The use of limerock in sufficient quantity will cause a precipitation of the copper content of the solution as copper carbonate or basic carbonate. In general, a quantity of limerock is used which will give the maximum precipitation of impurities without an undesirable precipitation of copper. The quantity to be used in any particular case may be determined by a series of tests on sample quantities of the solution, using different quantities of limerock. As a rule the quantity of limerock used is just sufficient to give a substantially neutral solution.

In place of limerock, any other suitable basic precipitant, such as lime, may be used but we prefer to use limerock or limestone since it is effective and inexpensive. Other modifications of the cyclical procedure for other purposes, for instance, the recovery of copper from the limerock precipitation, may of course be made without departing from our invention.

We claim:—

1. In a process for the recovery of copper from ores comprising leaching an ore with a solution containing an acid, subjecting the leaching solution to electrolysis to precipitate the copper and regenerate the acid and using the regenerated acid for leaching more ore, the step which consists in treating said leaching solution with a reagent capable of precipitating iron.

2. In a process comprising leaching an oxide copper ore containing iron with a solution containing sulfuric acid, subjecting the resulting leaching solution to electrolysis, and using the electrolyzed solution to leach more oxide copper ore containing iron, the step which consists in agitating said leaching solution prior to subjecting it to electrolysis with finely divided limerock in quantity sufficient to precipitate substantially all of the ferric iron present in the solution and separating the resulting precipitate from the solution.

In testimony whereof, we affix our signatures.

FREDERICK LAIST.
FREDERICK F. FRICK.